United States Patent
Brown

(10) Patent No.: US 9,183,401 B2
(45) Date of Patent: Nov. 10, 2015

(54) SYSTEMS AND METHODS FOR SECURING PROTECTED CONTENT

(71) Applicant: Google Inc., Mountain View, CA (US)

(72) Inventor: Jeff Brown, Mountain View, CA (US)

(73) Assignee: Google Inc., Mountain View, CA (US)

( * ) Notice: Subject to any disclaimer, the term of this patent is extended or adjusted under 35 U.S.C. 154(b) by 76 days.

(21) Appl. No.: 13/938,073

(22) Filed: Jul. 9, 2013

(65) Prior Publication Data

US 2015/0020210 A1    Jan. 15, 2015

(51) Int. Cl.
*G06F 7/04* (2006.01)
*G06F 21/60* (2013.01)

(52) U.S. Cl.
CPC ........................................ *G06F 21/60* (2013.01)

(58) Field of Classification Search
None
See application file for complete search history.

(56) References Cited

U.S. PATENT DOCUMENTS

2006/0017747 A1* 1/2006 Dawson ........................ 345/629

OTHER PUBLICATIONS

Microsoft Computer Dictionary, 2002, Fifth Edition, p. 329.*

* cited by examiner

*Primary Examiner* — Brandon Hoffman
(74) *Attorney, Agent, or Firm* — Troutman Sanders LLP; James E. Schutz; Christopher C. Close, Jr.

(57) ABSTRACT

Systems and methods for securing protected content are provided. In one embodiment, a method comprises determining, at a computing device, that a first digital data includes protected content; determining that an unsecured rendering target is an output destination of the first digital data; masking, in response to determining that the unsecured rendering target is the output destination of the first digital data, the protected content of the first digital data to produce a second digital data, wherein at least a portion of the second digital data is masked protected content; overlaying unprotected content on the masked protected content to produce a third digital data, wherein at least a portion of the third digital data is the unprotected content overlaying the masked protected content; and outputting, for display at the unsecured rendering target, the third digital data.

20 Claims, 4 Drawing Sheets

SYSTEMS AND METHODS FOR SECURING PROTECTED CONTENT

BACKGROUND

It is commonly recognized that protected content is susceptible to unauthorized use, copying and distribution and may be copied without loss or degradation of quality. In addition, the widespread availability of computing devices such as personal computers and mobile phones has increased the ability to acquire, copy and distribute protected content. The owners of the protected content often impose restrictions on the use of the protected content. One common restriction is to prevent protected content from being distributed to an unsecured rendering target such as an unsecured display device or copied to a screenshot. These restrictions become even more complex when, for instance, the protected content of one computing device is mirrored to an unsecured rendering target such as an external display device or another computing device. Accordingly, there is a need for techniques to secure protected content. Furthermore, other desirable features and characteristics of the present disclosure will become apparent from the subsequent detailed description and claims, taken in conjunction with the accompanying figures and the foregoing technical field and background.

SUMMARY OF THE DISCLOSURE

The subject innovation relates to methods, devices, systems, and articles of manufacture for securing protected content. In one example embodiment, a computing device may determine that a first digital data includes protected content. Further, the computing device may determine that an unsecured rendering target is an output destination of the first digital data. In response to determining that the unsecured rendering target is the output destination of the first digital data, the computing device may mask the protected content of the first digital data to produce a second digital data. At least a portion of the second digital data may be masked protected content. The computing device may overlay unprotected content on the masked protected content to produce a third digital data. At least a portion of the third digital data may be the unprotected content overlaying the masked protected content. Finally, the computing device may output, for display at the unsecured rendering target, the third digital data.

BRIEF DESCRIPTION OF THE FIGURES

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where.

DETAILED DESCRIPTION

This disclosure provides example methods, devices, systems, and articles of manufacture for securing protected content. By configuring a computing device in accordance with various aspects described herein, increased usability of the computing device is provided. In one example, a computing device may disable playing protected content if there are any unsecured rendering targets such as unsecured video outputs. In another example, a computing device may provide unprotected content instead of protected content to an unsecured rendering target such as an unsecured display device. In another example, a computing device may convert the protected content to a lower quality unprotected content and provide such lower quality unprotected content to an unsecured rendering target. In another example, a computing device may disable access to all unsecured rendering targets during the rendering of protected content. In another example, a computing device may replace or mask the protected content with an image or pattern prior to distribution to an unsecured rendering target. In another example, a computing device may replace or mask the protected content with unprotected content prior to distribution to an unsecured rendering target.

In some instances, a graphical user interface may be referred to as an object-oriented user interface, an application oriented user interface, a web-based user interface, a touch-based user interface, or a virtual keyboard. A presence-sensitive input device as discussed herein, may be a device that accepts input by the proximity of a finger, a stylus, or an object near the device. Additionally, a presence-sensitive input device may be combined with a display to provide a presence-sensitive display. For example, a user may provide an input to a computing device by touching the surface of a presence-sensitive display using a finger. In another example, a user may provide input to a computing device by gesturing without physically touching any object. For example, a gesture may be received via a video camera or depth camera.

In some instances, a presence-sensitive display can have two main attributes. First, it may enable a user to interact directly with what is displayed, rather than indirectly via a pointer controlled by a mouse or touchpad. Secondly, it may allow a user to interact without requiring any intermediate device that would need to be held in the hand. Such displays may be attached to computers, or to networks as terminals. Such displays may also play a prominent role in the design of digital appliances such as the personal digital assistant (PDA), satellite navigation devices, mobile phones, and video games. Further, such displays may include a capture device and a display.

Figure 1:
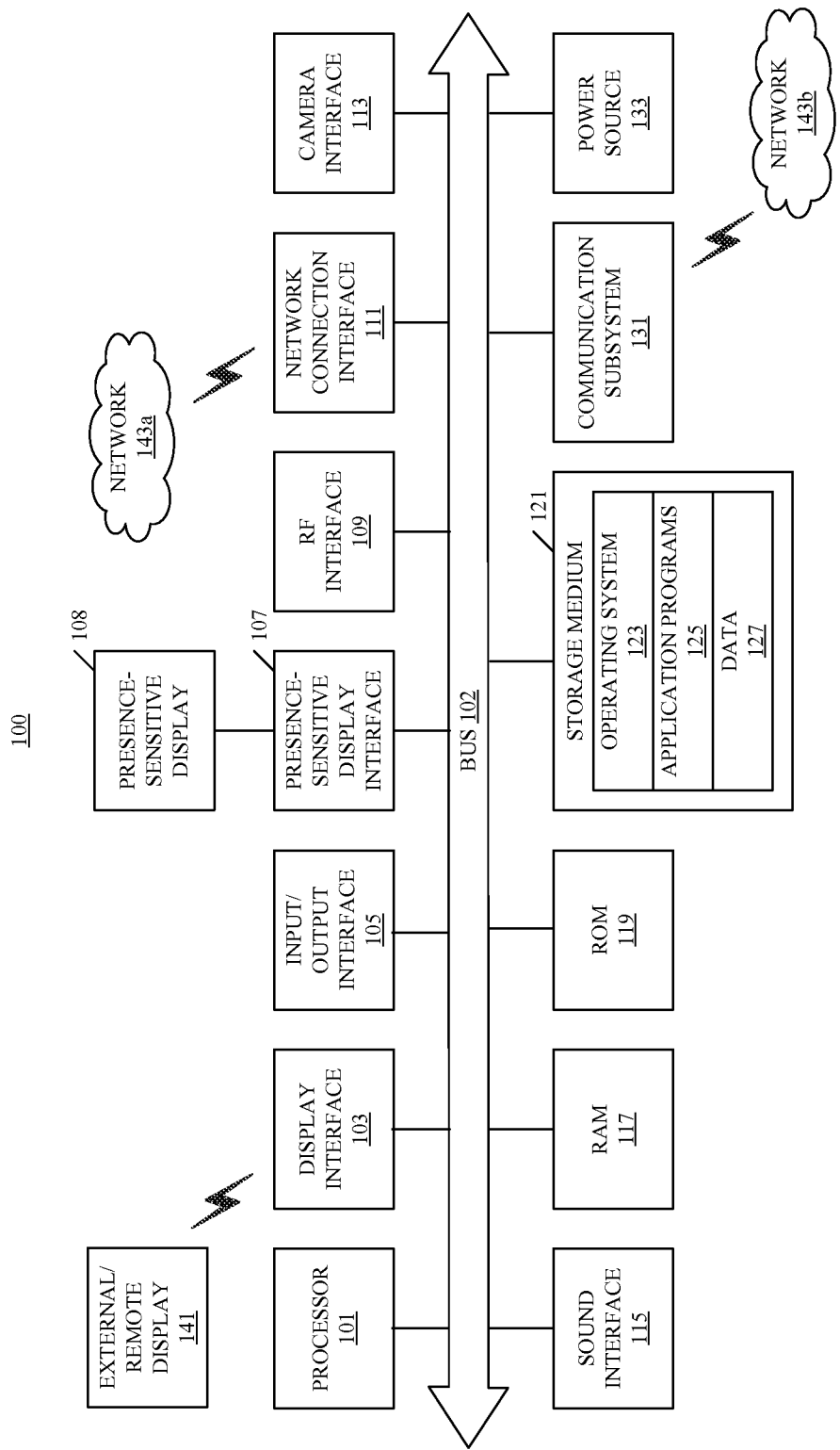
FIG. 1 is a block diagram illustrating one embodiment of a computing device in accordance with various aspects set forth herein.

According to one example implementation, the terms computing device or mobile computing device, as used herein, may be a central processing unit (CPU), controller or processor, or may be conceptualized as a CPU, controller or processor (for example, the processor 101 of FIG. 1). In yet other instances, a computing device may be a CPU, controller or processor combined with one or more additional hardware components. In certain example implementations, the computing device operating as a CPU, controller or processor may be operatively coupled with one or more peripheral devices, such as a display, navigation system, stereo, entertainment center, Wi-Fi access point, or the like. In another example implementation, the term computing device, as used herein, may refer to a mobile computing device, such as a smartphone, mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In an example embodiment, the computing device may output content to its local display or speaker(s). In another example implementation, the computing device may output content to an external display device (e.g., over Wi-Fi) such as a TV or an external computing system.

FIG. 1 is a block diagram illustrating one embodiment of a computing device 100 in accordance with various aspects set forth herein. In FIG. 1, the computing device 100 may be configured to include a processor 101, which may also be referred to as a computing device, that is operatively coupled to a display interface 103, an input/output interface 105, a presence-sensitive display interface 107, a radio frequency (RF) interface 109, a network connection interface 111, a camera interface 113, a sound interface 115, a random access memory (RAM) 117, a read only memory (ROM) 119, a storage medium 121, an operating system 123, an application program 125, data 127, a communication subsystem 131, a power source 133, another element, or any combination thereof. In FIG. 1, the processor 101 may be configured to process computer instructions and data. The processor 101 may be configured to be a computer processor or a controller. For example, the processor 101 may include two computer processors. In one definition, data is information in a form suitable for use by a computer. It is important to note that a person having ordinary skill in the art will recognize that the subject matter of this disclosure may be implemented using various operating systems or combinations of operating systems.

In FIG. 1, the display interface 103 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 103 may be operatively coupled to a local display, such as a touch-screen display associated with a mobile device. In another example, the display interface 103 may be configured to provide video, graphics, images, text, other information, or any combination thereof for an external/remote display 141 that is not necessarily connected to the mobile computing device. In one example, a desktop monitor may be utilized for mirroring or extending graphical information that may be presented on a mobile device. In another example, the display interface 103 may wirelessly communicate, for example, via the network connection interface 111 such as a Wi-Fi transceiver to the external/remote display 141.

In the current embodiment, the input/output interface 105 may be configured to provide a communication interface to an input device, output device, or input and output device. The computing device 100 may be configured to use an output device via the input/output interface 105. A person of ordinary skill will recognize that an output device may use the same type of interface port as an input device. For example, a USB port may be used to provide input to and output from the computing device 100. The output device may be a speaker, a sound card, a video card, a display, a monitor, a printer, an actuator, an emitter, a smartcard, another output device, or any combination thereof. The computing device 100 may be configured to use an input device via the input/output interface 105 to allow a user to capture information into the computing device 100. The input device may include a mouse, a trackball, a directional pad, a trackpad, a presence-sensitive input device, a presence-sensitive display, a scroll wheel, a digital camera, a digital video camera, a web camera, a microphone, a sensor, a smartcard, and the like. The presence-sensitive input device may include a digital camera, a digital video camera, a web camera, a microphone, a sensor, or the like to sense input from a user. The presence-sensitive input device may be combined with a display to form a presence-sensitive display. Further, the presence-sensitive input device may be coupled to the computing device. The sensor may be, for instance, an accelerometer, a gyroscope, a tilt sensor, a force sensor, a magnetometer, an optical sensor, a proximity sensor, another like sensor, or any combination thereof. For example, the input device 115 may be an accelerometer, a magnetometer, a digital camera, a microphone, and an optical sensor.

In FIG. 1, the presence-sensitive display interface 107 may be configured to provide a communication interface to a pointing device or a presence-sensitive display 108 such as a touch screen. In one definition, a presence-sensitive display is an electronic visual display that may detect the presence and location of a touch, gesture, or object near its display area. In one definition, the term "near" means on, proximate or associated with. In another definition, the term "near" is the extended spatial location of. The RF interface 109 may be configured to provide a communication interface to RF components such as a transmitter, a receiver, and an antenna. The network connection interface 111 may be configured to provide a communication interface to a network 143a. The network 143a may encompass wired and wireless communication networks such as a local-area network (LAN), a wide-area network (WAN), a computer network, a wireless network, a telecommunications network, another like network or any combination thereof. For example, the network 143a may be a cellular network, a Wi-Fi network, and a near-field network. As previously discussed, the display interface 103 may be in communication with the network connection interface 111, for example, to provide information for display on a remote display that is operatively coupled to the computing device 100. The camera interface 113 may be configured to provide a communication interface and functions for capturing digital images or video from a camera. The sound interface 115 may be configured to provide a communication interface to a microphone or speaker.

In this embodiment, the RAM 117 may be configured to interface via the bus 102 to the processor 101 to provide storage or caching of data or computer instructions during the execution of software programs such as the operating system, application programs, and device drivers. In one example, the computing device 100 may include at least one hundred and twenty-eight megabytes (128 Mbytes) of RAM. The ROM 119 may be configured to provide computer instructions or data to the processor 101. For example, the ROM 119 may be configured to be invariant low-level system code or data for basic system functions such as basic input and output (I/O), startup, or reception of keystrokes from a keyboard that are stored in a non-volatile memory. The storage medium 121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives. In one example, the storage medium 121 may be configured to include an operating system 123, an application program 125 such as a web browser application, a widget or gadget engine or another application, and a data file 127.

In FIG. 1, the computing device 101 may be configured to communicate with a network 143b using the communication subsystem 131. The network 143a and the network 143b may be the same network or networks or different network or networks. The communication functions of the communication subsystem 131 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 131 may include cellular communication, Wi-Fi communication, Bluetooth communication, and GPS communication. The network 143b may encompass wired and wireless communication networks such as a local-area network (LAN), a wide-area network (WAN), a computer network, a wireless network, a telecommunications network, another like network or any combination thereof. For example, the network 143b may be a cellular network, a Wi-Fi network, and a near-field network. The power source 133 may be configured to provide an alternating current (AC) or direct current (DC) power to components of the computing device 100.

In FIG. 1, the storage medium 121 may be configured to include a number of physical drive units, such as a redundant array of independent disks (RAID), a floppy disk drive, a flash memory, a USB flash drive, an external hard disk drive, thumb drive, pen drive, key drive, a high-density digital versatile disc (HD-DVD) optical disc drive, an internal hard disk drive, a Blu-Ray optical disc drive, a holographic digital data storage (HDDS) optical disc drive, an external mini-dual in-line memory module (DIMM) synchronous dynamic random access memory (SDRAM), an external micro-DIMM SDRAM, a smartcard memory such as a subscriber identity module or a removable user identity (SIM/RUIM) module, other memory, or any combination thereof. The storage medium 121 may allow the computing device 100 to access computer-executable instructions, application programs or the like, stored on transitory or non-transitory memory media, to off-load data, or to upload data. An article of manufacture, such as one utilizing a communication system may be tangibly embodied in storage medium 122, which may comprise a computer-readable medium.

Figure 2:
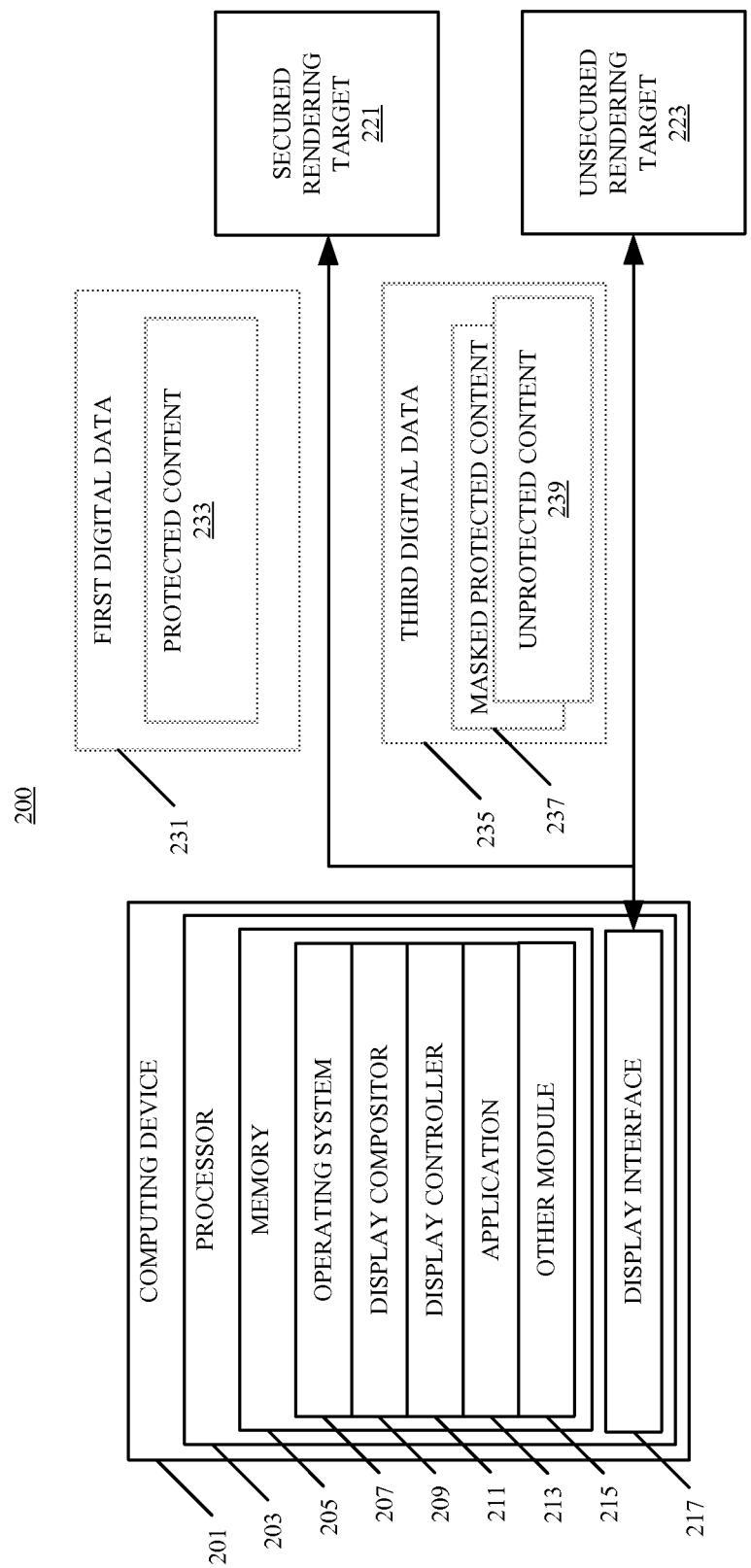
FIG. 2 illustrates one embodiment of a system for securing protected content in accordance with various aspects set forth herein.

FIG. 2 illustrates one embodiment of a system 200 for securing protected content in accordance with various aspects set forth herein. In FIG. 2, the system 200 may be configured to include a computing device 201, a secured rendering target 221 and an unsecured rendering target 223. The secured rendering target 221 may be a screenshot, an image, video, audio, a virtual display, a virtual surface, a virtual window, a virtual view, a buffer such as a graphics buffer, a stream such as a video stream, a printer, a wireless device, a POTS device, a computer, a projector, a display, a portable computer, a smartphone, another computing device, or the like. Further, the secured rendering target 221 may be configured to receive protected content from the computing device 201 via the display interface 217. In one example, the secured rendering target 221 may support copy protection such as high-bandwidth digital content protection (HDCP) or digital transmission content protection (DTCP). Similarly, the unsecured rendering target 223 may be a screenshot, an image, video, audio, a virtual display, a virtual surface, a virtual window, a virtual view, a buffer such as a graphics buffer, a stream such as a video stream, a printer, a wireless device, a POTS device, a computer, a projector, a display, a portable computer, a smartphone, another computing device, or the like. Further, the unsecured rendering target 221 may not be configured to receive protected content from the computing device 201.

In FIG. 2, the computing device 201 may be configured to include a processor 203 operatively coupled to a memory 205. The memory 205 may be configured to include an operating system 207, a display compositor module 209, a display controller module 211, an application 213 and another module 215. The display compositor 209 may determine that a first digital data 231 includes protected content 233. Further, the display compositor 209 may associate a secured indicator with the protected content 233 of the first digital data 231. The secured indicator may be used, for instance, by the operating system 207, the display compositor module 209, the display controller module 211, the application 215, the other module 217, the computing device 201, the secured rendered target 221, the unsecured rendered target 223, the system 200, or any of their components or elements to protect the protected content 233. The secured indicator may be a flag, a type code, a class, a policy function, an evaluation rule or the like. For example, the display compositor module 209 may use a flag such as "FLAG_SECURE" as a secured indicator to indicate that a window, a view, a virtual surface, a graphics buffer, a stream or any portion thereof includes the protected content 233. In another example, a policy function may be used to identify secured content such as by determining that a virtual surface includes video content in a particular format. Further, the display compositor module 209 may determine that the secured rendering target 221 is an output destination for the first digital data 231. In one example, the display compositor module 209 may determine a rendering target using an HDMI input with HDCP enabled is a secured rendering target. In another example, the display compositor module 209 may determine a rendering target using DTCP is a secured rendering target. The display controller module 211 may output via the display interface 217, for display at the secured rendering target 221, the first digital data 231.

Furthermore, the display compositor module 209 may determine that the unsecured rendering target 223 is an output destination for the first digital data 231. Further, when rendering all or a portion of the contents of a display of the computing device 201 to a screenshot, an image, video, audio, a virtual display, a virtual surface, a virtual window, a virtual view, a buffer such as a graphics buffer, a stream such as a video stream, a printer, a wireless device, a POTS device, a computer, a projector, a display, a portable computer, a smartphone, another computing device, or the like, the display compositor module 209 may determine whether the rendering target is secure. In one example, the display compositor module 209 may determine a rendering target using an HDMI input with HDCP disabled is an unsecured rendering target. In another example, the display compositor module 209 may determine a rendering target with no DTCP capability or with DTCP disabled is an unsecured rendering target. In another example, the display compositor module 209 may determine a screenshot taken by the operating system 207 of the computing device 201 for the purposes of animating certain special transitions is a secure rendering target since, for instance, the screenshot would only be made available to the operating system 207. In an alternative example, the display compositor module 209 may determine a screenshot taken by an application executed by the operating system 207 is an unsecured rendering target since, for instance, the screenshot may be saved or redirected to an unsecured rendering target.

In FIG. 2, in response to determining that the unsecured rendering target 223 is the output destination of the first digital data 231, the display compositor module 209 may mask the protected content 233 of the first digital data 231 to produce a second digital data. At least a portion of the second digital data may be masked protected content 237. The display compositor module 209 may mask the protected content 233 to prevent the masked protected content 237 from being rendered by the unsecured rendering target 223. Further, the display compositor module 209 may mask the protected content 233 by replacing the protected content 233 with an opaque or translucent shape such as an opaque black rectangle; selectively blanking portions of the protected content 233; replacing the protected content 233 with a pattern or color; selectively removing frames of the protected content 233; blurring the protected content 233; scrambling the protected content 233; masking a virtual surface of the protected content 233; reducing the quality of the protected content 233; making the protected content 233 partially or fully unrecognizable; encrypting the protected content 233; watermarking the protected content 233; decimating the image quality of the protected content 233; obscuring the protected content 233; the like; or any combination thereof. It is important to note that the display compositor 209 may mask the protected content 233 both for copy protection and for limiting viewing access.

The display compositor module 209 may overlay unprotected content 239 on the masked protected content 237 to produce a third digital data 235. For example, the display compositor module 209 may overlay the unprotected content 239 of a second virtual surface on the masked protected content 237 of a first virtual surface to produce the third digital data 235. In another example, the display compositor module 209 may overlay the unprotected content 239 on the masked protected content 237 by replacing the masked protected content 237 with the unprotected content 239. In another example, the display compositor module 209 may overlay the masked protected content 237 by partially concealing the masked protected content 237. In another example, the display compositor module 209 may overlay the masked protected content 237 by replacing any or all portions of the masked protected content 237. In another example, the display compositor module 209 may overlay the masked protected content 237 by replacing any or all portions of the masked protected content 237 with opaque regions such as patterned partially opaque regions to reduce the image quality of the masked protected content 237. In another example, the display compositor module 209 may overlay any or all portions of the masked protected content 237. In another example, the display compositor module 209 may overlay the entire viewable area of a screen or display. In another example, the display compositor module 209 may overlay controls associated with the masked protected content 237. At least a portion of the third digital data 235 may be the masked protected content 237 of the first virtual surface overlaid by the unprotected content 239 of the second virtual surface. Further, the display compositor 209 may associate a masked secured indicator with the masked protected content 235 of the third digital data 231. The masked secured indicator may be used to indicate, for instance, that the masked protected content 235 of the third digital data 231 is secured or masked, requires security or masking, uses or requires a type of security or masking, or the like. Further, the masked secured indicator may be used by, for instance, the operating system 207, the display compositor module 209, the display controller module 211, the application 215, the other module 217, the computing device 201, the secured rendered target 221, the unsecured rendered target 223, the system 200, or any of their components or elements. The masked secured indicator may be a flag, a type code, a class, a policy function, an evaluation rule or the like. For example, the display compositor module 209 may use a flag such as "FLAG_MASKED_SECURED" as a masked secured indicator to indicate that a virtual window, a virtual view, a virtual surface, a buffer, a stream or any portion thereof includes protected content. In an alternative embodiment, the display compositor module 209 may use the secured indicator.

Similarly, the display compositor 209 may associate an unsecured indicator with the unprotected content 239 of the third digital data 235. The unsecured indicator may used to, for instance, allow an application to provide virtual surfaces that are only rendered on unsecured targets as a means of overlaying otherwise masked secured content with unsecured content. The unsecured indicator may be a flag, a type code, a class, a policy function, an evaluation rule or the like. The unsecured indicator may be used by, for instance, the operating system 207, the display compositor module 209, the display controller module 211, the application 215, the other module 217, the computing device 201, the secured rendered target 221, the unsecured rendered target 223, the system 200, or any of their components or elements. For example, the display compositor module 209 may use a flag such as "FLAG_UNSECURE" as an unsecured indicator to indicate that a virtual window, a virtual view, a virtual surface, a buffer, a stream or any portion thereof includes unprotected content. The unsecured indicator may be used by the unsecured rendering target 223 to indicate that the unprotected content 239 may be rendered. Further, the unsecured indicator may be used by the secured rendering target 221 to indicate that the unprotected content 239 should not be rendered and instead the protected content 233 or the masked protected content 237 should be rendered.

In FIG. 2, the unprotected content 239 may include a message, a phone number, a guide, an image, an advertisement, an instruction, a virtual control, or the like. A message may be, for instance, text or an iconographic. In one example, the unprotected content 239 may include a message to instruct a viewer that the protected content 233 has been masked due to content protection. In another example, the application 213 of the computing device 201 may provide unprotected content 239 such as a troubleshooting guide, a phone number for help support, an image of the digital versatile disk (DVD) box art, transport controls indicating the current playback position, or even advertising for equipment that does support the necessary content protection. The display controller module 211 may output via the display interface 217, for display at the unsecured rendering target 223, the third digital data 235.

In another embodiment, the operating system 207 may inform the application 213 that the protected content 233 may currently be viewed on the secured rendering target 221 but masked on the unsecured rendering target 223. The application 213 may then provide the unprotected content 239 to the unsecured rendering target 223.

In another embodiment, the operating system 207 may provide the unprotected content 239 if the application 213 does not provide the unprotected content 239 when providing the third digital data 235 to the unsecured rendering target 223.

In another embodiment, the display compositor 209 may use a secured buffer to provide the protected content 233. Further, the display compositor 209 may use an unsecured buffer to provide the unprotected content 239

Figure 3:
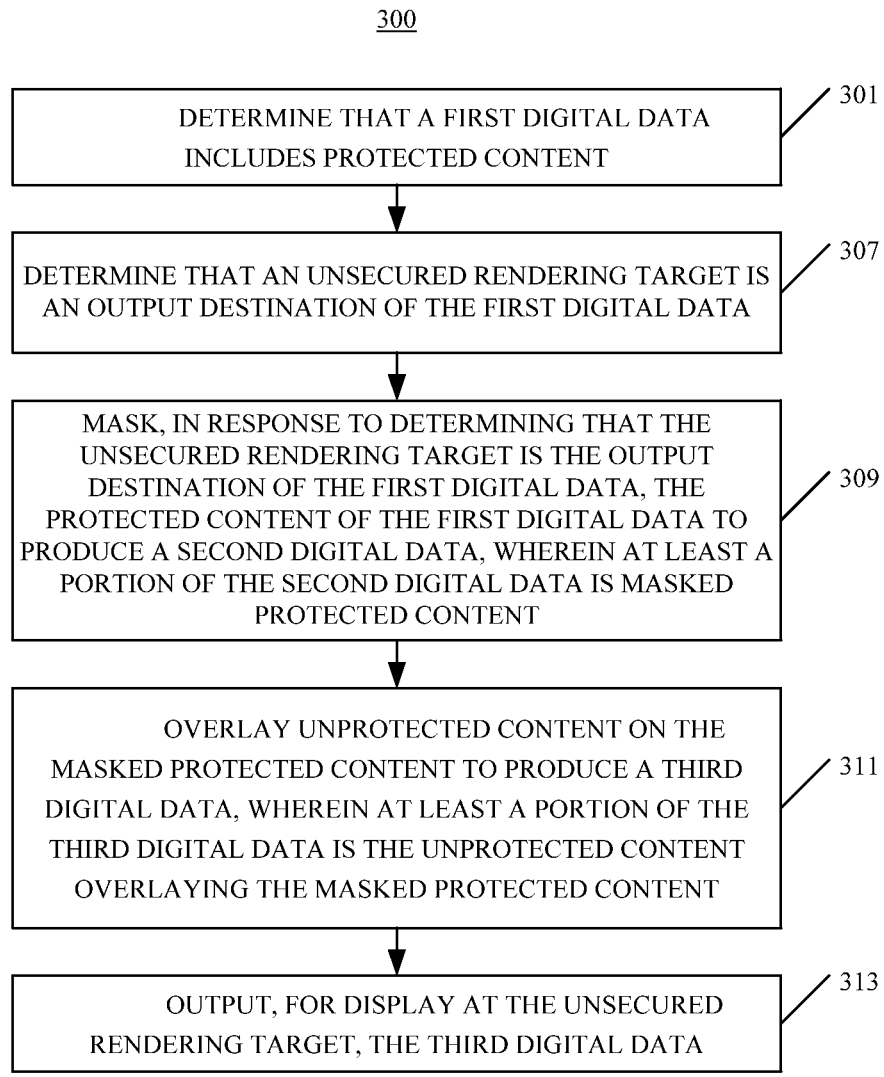
FIG. 3 is a flow chart illustrating one embodiment of a method for securing protected content with various aspects described herein.

FIG. 3 is a flow chart illustrating one embodiment of a method 300 for securing protected content with various aspects described herein. In FIG. 3, the method 300 may begin at, for instance, block 301, where it may determine that a first digital data includes protected content. The method 300 may associate a secured indicator with the protected content of the first digital data. The secured indicator may be used, for instance, by the operating system 207, the display compositor module 209, the display controller module 211, the application 215, the other module 217, the computing device 201, the secured rendered target 221, the unsecured rendered target 223, the system 200, or any of their components or elements to protect the protected content. The secured indicator may be a flag, a type code, a class, a policy function, an evaluation rule or the like. For example, the method 300 may use a flag such as "FLAG_SECURED" as a secured indicator to indicate that a virtual window, a virtual view, a virtual surface, a buffer, a stream or any portion thereof includes the protected content. Further, the method 300 may determine that the secured rendering target is an output destination for the first digital data. In one example, a rendering target using an HDMI input with HDCP enabled may be a secured rendering target. In another example, a rendering target using DTCP may be considered a secured rendering target.

At block 307, the method 300 may determine that an unsecured rendering target is an output destination of the first digital data. The method 300 may determine that the unsecured rendering target does not support copy protection. In one example, the copy protection may be HDCP, DTCP or the like. At block 309, in response to determining that the unsecured rendering target is the output destination of the first digital data, the method 300 may mask the protected content of the first digital data to produce a second digital data. Further, at least a portion of the second digital data may be masked protected content. The method 300 may mask the protected content by replacing the protected content with an opaque or translucent shape such as an opaque black rectangle; selectively blanking portions of the protected content; replacing the protected content with a pattern or color; selectively removing frames of the protected content; blurring the protected content; scrambling the protected content; masking a virtual surface of the protected content; reducing the quality of the protected content; making the protected content partially or fully unrecognizable; encrypting the protected content; or the like.

At block 311, the method 300 may overlay unprotected content on the masked protected content to produce a third digital data. The method 300 may associate an unsecured indicator with the unprotected content of the third digital data. The unsecured indicator may be a flag, a type code, a class, a policy function, an evaluation rule or the like. The unsecured indicator may be used, for instance, by an operating system, a display compositor module, a display controller module, an application, another module, a computing device, a secured rendered target, an unsecured rendered target, a system, or any of their components or elements to recognize the unprotected content. For example, the method 300 may use a flag such as "FLAG_UNSECURED" as an unsecured indicator to indicate that a virtual window, a virtual view, a virtual surface, a buffer, a stream or any portion thereof includes unprotected content. The unsecured indicator may be used by the unsecured rendering target to indicate that the unprotected content may be rendered. Further, the unsecured indicator may be used by the secured rendering target to indicate that the unprotected content should not be rendered and instead the protected content should be rendered. The method 300 may place the masked protected content of the third digital data on a first virtual surface and place the unprotected content of the third digital data on a second virtual surface, wherein the second virtual surface overlays the first virtual surface. At block 313, the method 313 may output, for display at the unsecured rendering target, the third digital data.

Figure 4:
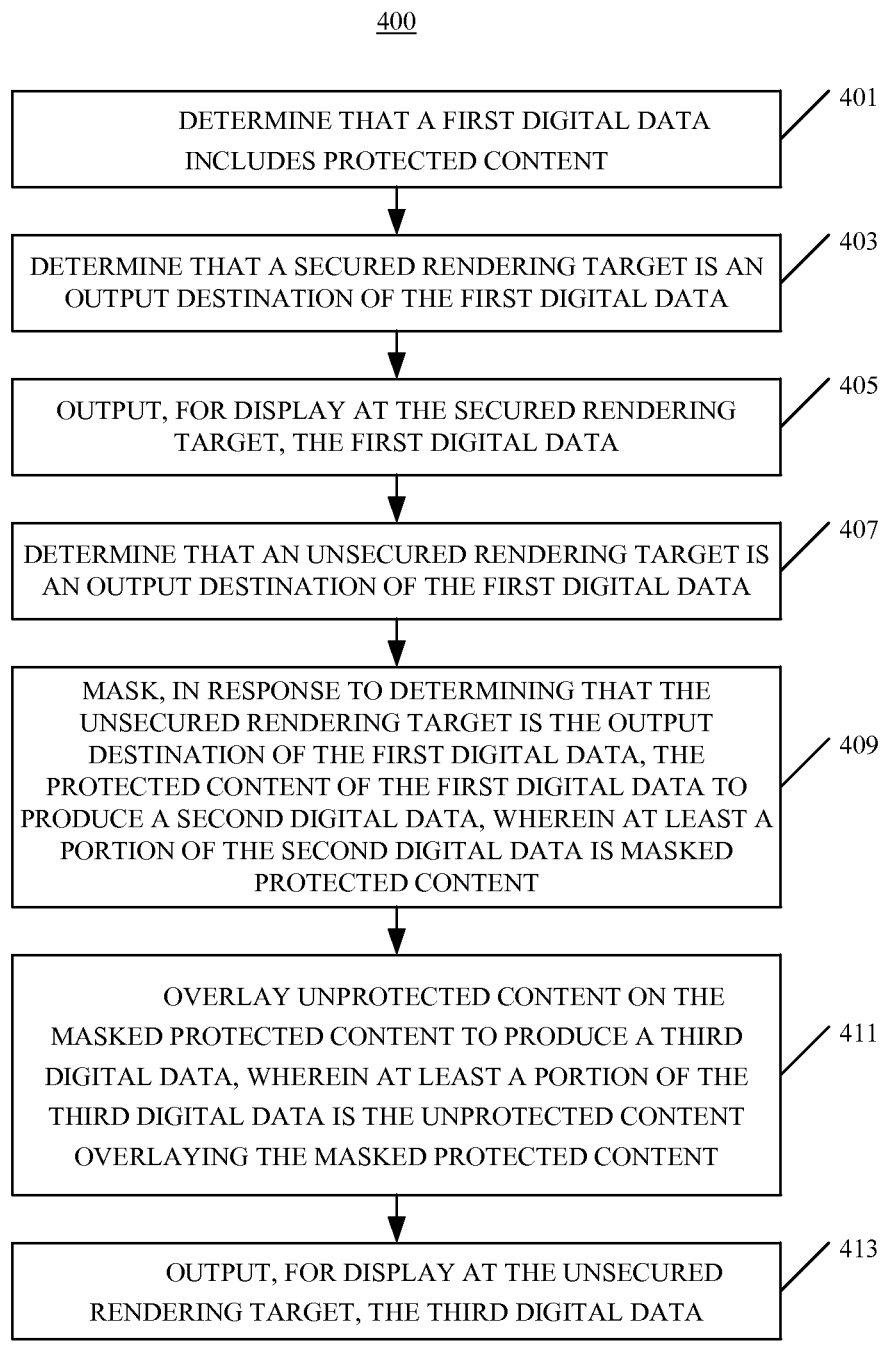
FIG. 4 is a flow chart illustrating another embodiment of a method for securing protected content with various aspects described herein.

FIG. 4 is a flow chart illustrating another embodiment of a method 400 for securing protected content with various aspects described herein. In FIG. 4, the method 400 may begin at, for instance, block 401, where it may determine that a first digital data includes protected content. The method 400 may associate a secured indicator with the protected content of the first digital data. The secured indicator may be used, for instance, by an operating system, a display compositor module, a display controller module, an application, another module, a computing device, a secured rendered target, an unsecured rendered target, a system, or any of their components or elements to protect the protected content. The secured indicator may be a flag, a type code, a class, a policy function, an evaluation rule or the like. For example, the method 400 may use a flag such as "FLAG_SECURED" as a secured indicator to indicate that a virtual window, a virtual view, a virtual surface, a buffer, a stream or any portion thereof includes the protected content. Further, the method 400 may determine that the secured rendering target is an output destination for the first digital data. In one example, a rendering target using an HDMI input with HDCP enabled may be a secured rendering target. In another example, a rendering target using DTCP may be considered a secured rendering target.

At block 403, the method 400 may determine that a secured rendering target is an output destination of the first digital data. At block 405, the method 400 may output, for display at the secured rendering target, the first digital data. At block 407, the method 400 may determine that an unsecured rendering target is an output destination of the first digital data. The method 400 may determine that the unsecured rendering target does not support copy protection. In one example, the copy protection may be HDCP, DTCP or the like. At block 409, in response to determining that the unsecured rendering target is the output destination of the first digital data, the method 400 may mask the protected content of the first digital data to produce a second digital data. Further, at least a portion of the second digital data may be masked protected content. The method 400 may mask the protected content by replacing the protected content with an opaque or translucent shape such as an opaque black rectangle; selectively blanking portions of the protected content; replacing the protected content with a pattern or color; selectively removing frames of the protected content; blurring the protected content; scrambling the protected content; masking a virtual surface of the protected content; reducing the quality of the protected content; making the protected content partially or fully unrecognizable; encrypting the protected content; or the like.

At block 411, the method 400 may overlay unprotected content on the masked protected content to produce a third digital data. The method 400 may associate an unsecured indicator with the unprotected content of the third digital data. The unsecured indicator may be a flag, a type code, a class, a policy function, an evaluation rule or the like. The unsecured indicator may be used, for instance, by an operating system, a display compositor module, a display controller module, an application, another module, a computing device, a secured rendered target, an unsecured rendered target, a system, or any of their components or elements to recognize the unprotected content. For example, the method 400 may use a flag such as "FLAG_UNSECURED" as an unsecured indicator to indicate that a virtual window, a virtual view, a virtual surface, a buffer, a stream or any portion thereof includes unprotected content. The unsecured indicator may be used by the unsecured rendering target to indicate that the unprotected content may be rendered. Further, the unsecured indicator may be used by the secured rendering target to indicate that the unprotected content should not be rendered and instead the protected content should be rendered. The method 400 may place the masked protected content of the third digital data on a first virtual surface and place the unprotected content of the third digital data on a second virtual surface, wherein the second virtual surface overlays the first virtual surface. At block 413, the method 413 may output, for display at the unsecured rendering target, the third digital data.

The previous detailed description is merely illustrative in nature and is not intended to limit the present disclosure, or the application and uses of the present disclosure. Furthermore, there is no intention to be bound by any expressed or implied theory presented in the preceding field of use, background or summary of the disclosure or the following detailed description. The present disclosure provides various examples, embodiments and the like, which may be described herein in terms of functional or logical block elements. Various techniques described herein may be used for securing protected content. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware, or any combination thereof to control a computing device to implement the disclosed subject matter. The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

Throughout the specification and the claims, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or." Further, the terms "a," "an," and "the" are intended to mean one or more unless specified otherwise or clear from the context to be directed to a singular form. The term "include" and its various forms are intended to mean including but not limited to.

In the previous description, numerous specific details are set forth. However, it is to be understood that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

It is important to recognize that it is impractical to describe every conceivable combination of components or methodologies for purposes of describing the claimed subject matter. However, a person having ordinary skill in the art will recognize that many further combinations and permutations of the subject innovations are possible. Accordingly, the claimed subject matter is intended to cover all such alterations, modifications and variations that are within the spirit and scope of the claimed subject matter.

Although the present disclosure describes specific examples, embodiments, and the like, various modifications and changes may be made without departing from the scope of the present disclosure as set forth in the claims below. For example, although the example methods, devices, systems, or articles of manufacture described herein are in conjunction with securing protected content, the skilled artisan will readily recognize that the example methods, devices, systems, or articles of manufacture may be used in other methods, devices, systems, or articles of manufacture and may be configured to correspond to such other example methods, devices, systems, or articles of manufacture as needed. Further, while at least one example, embodiment, or the like has been presented in the foregoing detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all of the claims. Any benefits, advantages, or solutions to problems that are described herein with regard to specific examples, embodiments, or the like are not intended to be construed as a critical, required, or essential feature or element of any or all of the claims.

What is claimed is:

1. A method, comprising:
    determining, at a computing device, that a first digital data includes protected content;
    responsive to determining that an output destination of the first digital data is an unsecured rendering target, masking the protected content of the first digital data to produce a second digital data, wherein at least a portion of the second digital data is masked protected content;
    overlaying unprotected content on the masked protected content to produce a third digital data, wherein at least a portion of the third digital data is the unprotected content overlaying the masked protected content, and wherein the unprotected content is different from the protected content; and
    outputting, for display at the unsecured rendering target, the third digital data.

2. The method of claim 1, wherein an output destination is a first output destination, further comprising:
    responsive to determining that a second output destination of the first digital data is a secured rendering target; and
    outputting, for display at the secured rendering target, the first digital data.

3. The method of claim 1, wherein determining that the first digital data includes the protected content includes associating a secured indicator with the protected content of the first digital data.

4. The method of claim 1, wherein determining that the first digital data includes the protected content includes determining that the first digital data includes video content in a particular format.

5. The method of claim 1, wherein overlaying unprotected content on the masked protected content to produce the third digital data includes associating an unsecured indicator with the unprotected content of the third digital data.

6. The method of claim 1, wherein overlaying unprotected content on the masked protected content to produce the third digital data includes placing the masked protected content of the second digital data on a first virtual surface and placing the unprotected content of the third digital data on a second virtual surface, wherein the second virtual surface overlays the first virtual surface.

7. The method of claim 1, wherein determining that an unsecured rendering target is an output destination of the first digital data includes determining that the unsecured rendering target does not support copy protection.

8. The method of claim 7, wherein the copy protection is at least one of high-bandwidth digital content protection (HDCP) and digital transmission content protection (DTCP).

9. The method of claim 1, wherein masking the protected content of the first digital data to produce a second digital data includes selectively blanking the protected content of the first digital data.

10. The method of claim 1, wherein masking the protected content of the first digital data to produce a second digital data includes replacing the protected content of the first digital data with a mask.

11. The method of claim 10, wherein the mask is translucent.

12. The method of claim 1, wherein masking the protected content of the first digital data to produce a second digital data includes blurring the protected content of the first digital data.

13. The method of claim 1, wherein masking the protected content of the first digital data to produce a second digital data includes reducing a quality of the protected content of the first digital data.

14. The method of claim 1, wherein the unprotected content includes a message.

15. A system, comprising:
a memory configured to store data and computer-executable instructions; and
a processor operatively coupled to the memory, wherein the processor and memory are configured to:
determine that a first digital data includes protected content;
responsive to determining that an output destination of the first digital data is an unsecured rendering target, mask the protected content of the first digital data to produce a second digital data, wherein at least a portion of the second digital data is masked protected content;
overlay unprotected content on the masked protected content to produce a third digital data, wherein at least a portion of the third digital data is the unprotected content overlaying the masked protected content, and wherein the unprotected content is different from the protected content; and
output, for display at the unsecured rendering target, the third digital data.

16. The system of claim 15, wherein an output destination is a first output destination, and wherein the processor and memory are further configured to:
responsive to determining that a second output destination of the first digital data is a secured rendering target, output, for display at the secured rendering target, the first digital data.

17. The system of claim 15, wherein the processor and memory are further configured to associate a secured indicator with the protected content of the first digital data.

18. A non-transitory computer-readable medium encoded with a computer program, the computer program comprising computer-executable instructions that when executed by a processor causes the processor to perform operations, wherein the operations are configured to:
determine that a first digital data includes protected content;
responsive to determining that an output destination of the first digital data is an unsecured rendering target, mask the protected content of the first digital data to produce a second digital data, wherein at least a portion of the second digital data is masked protected content;
overlay unprotected content on the masked protected content to produce a third digital data, wherein at least a portion of the third digital data is the unprotected content overlaying the masked protected content, and wherein the unprotected content is different from the protected content; and
output, for display at the unsecured rendering target, the third digital data.

19. The computer-readable medium of claim 18, wherein an output destination is a first output destination, and wherein the operations are further configured to:
responsive to determining that a second output destination of the first digital data is a secured rendering target, output, for display at the secured rendering target, the first digital data.

20. The computer-readable medium of claim 18, wherein the operations are further configured to associate a secured indicator with the protected content of the first digital data.

* * * * *